United States Patent
Brown et al.

(10) Patent No.: US 9,017,033 B2
(45) Date of Patent: Apr. 28, 2015

(54) FAN BLADE PLATFORM

(75) Inventors: Charles W. Brown, East Hampton, CT (US); Shelton O. Duelm, Wethersfield, CT (US); Christopher M. Quinn, Middletown, CT (US); Alan J. Walker, Canton, CT (US)

(73) Assignee: United Technologies Corporation, Hartford, CT (US)

( * ) Notice: Subject to any disclaimer, the term of this patent is extended or adjusted under 35 U.S.C. 154(b) by 685 days.

(21) Appl. No.: 13/490,571

(22) Filed: Jun. 7, 2012

(65) Prior Publication Data

US 2013/0330196 A1  Dec. 12, 2013

(51) Int. Cl.
*F01D 11/00* (2006.01)
*F01D 5/14* (2006.01)

(52) U.S. Cl.
CPC .............. *F01D 5/147* (2013.01); *F01D 11/008* (2013.01); *F05D 2220/36* (2013.01); *F05D 2260/36* (2013.01); *Y02T 50/672* (2013.01)

(58) Field of Classification Search
CPC ..................................................... F01D 11/008
USPC ................................................. 416/194, 239
See application file for complete search history.

(56) References Cited

U.S. PATENT DOCUMENTS

| | | | |
|---|---|---|---|
| 3,640,640 A * | 2/1972 | Palfreyman et al. | 416/2 |
| 4,019,832 A * | 4/1977 | Salemme et al. | 416/135 |
| 4,802,824 A | 2/1989 | Gastebois et al. | |
| 5,662,458 A | 9/1997 | Owen | |
| 5,791,877 A * | 8/1998 | Stenneler | 416/221 |
| 5,836,744 A | 11/1998 | Zipps et al. | |
| 5,957,658 A | 9/1999 | Kasprow et al. | |
| 6,055,805 A | 5/2000 | El-Aini et al. | |
| 6,125,626 A | 10/2000 | El-Aini et al. | |
| 6,145,300 A | 11/2000 | Romani | |
| 6,146,099 A * | 11/2000 | Zipps et al. | 416/193 A |
| 6,341,939 B1 * | 1/2002 | Lee | 416/97 R |
| 6,554,564 B1 | 4/2003 | Lord | |
| 6,764,282 B2 | 7/2004 | Suciu et al. | |
| 6,951,447 B2 | 10/2005 | Cherolis et al. | |
| 6,991,428 B2 | 1/2006 | Crane | |
| 7,156,621 B2 | 1/2007 | Stone | |
| 7,252,481 B2 | 8/2007 | Stone | |
| 7,931,442 B1 * | 4/2011 | Liang | 416/193 A |
| 8,066,479 B2 | 11/2011 | El-Aini et al. | |
| 2008/0232969 A1 * | 9/2008 | Brault et al. | 416/219 R |
| 2011/0038710 A1 | 2/2011 | Kemppainen et al. | |

FOREIGN PATENT DOCUMENTS

JP  10-252413 A  9/1998

OTHER PUBLICATIONS

International Search Report and Written Opinion, dated Sep. 4, 2013, for PCT Application No. PCT/US2013/044733, 12 pages.

* cited by examiner

*Primary Examiner* — Nathaniel Wiehe
*Assistant Examiner* — Michael Sehn
(74) *Attorney, Agent, or Firm* — Kinney & Lange, P.A.

(57) ABSTRACT

A fan assembly includes a first fan blade with a rib extending therealong and a first fairing platform mounted on and supported from the first fan blade. The first fairing platform has a flange with a groove that mates with the rib.

20 Claims, 6 Drawing Sheets

FAN BLADE PLATFORM

BACKGROUND

The present invention relates to gas turbine engines, and more particularly to fairing platforms for a fan section of gas turbine engines.

Gas turbine engines, such as turbofan engines for an aircraft, include a fan section, a compression section, a combustion section, and a turbine section. A primary flow path for working medium flow gases extends axially through the sections of the engine. A secondary flow path (bypass) for flow gases extends parallel to and radially outward of the primary flow path and passes through the fan section.

The fan section includes a rotor assembly and a stator assembly. The rotor assembly of the fan includes a fan hub and a plurality of outwardly extending airfoils. Each airfoil includes a blade portion, a root portion, and a fairing platform. The blade portion of the airfoil extends through the flow path and interacts with the gases passing therethrough to transfer energy between the rotor assembly and the gases. The fairing platform typically extends circumferentially from the rotor blade to an adjacent rotor blade and is disposed radially between the blade portion and the root portion. The stator assembly includes a fan case, which circumscribes the rotor assembly in close proximity to the tips of the blades.

During operation, the fan draws the gases (air) into the engine. The fan (driven by the turbine) raises the pressure of the air drawn along the secondary flow path, thus producing useful thrust. Improvements in fan performance depend in many cases on reducing fluid flow leakage at various points in the fan. One of these places is between adjacent fan blades at the inner radial portions thereof adjacent the fan hub. Typically, fairing platforms are utilized to seal this gap and to form the inner fan air flow path between the fan blades. Indeed, the gap must be sealed to prevent leakage recirculation from the blade trailing edge forward and up through the gap into the fan flow path.

Traditionally, fairing platforms were created from stock along with the fan blade. Rubber flap seals were then used to seal the gaps between adjacent fairing platforms. However, as fan blades are typically constructed of alloys, machining the fairing platform from stock is expensive and time consuming. Thus, alternative fairing platform designs have been developed. These alternatives typically use a fairing platform that is separate from the blade and hub. This alternative design is constructed of composite materials using expensive resin transfer molding techniques and utilizes an epoxy bulk seal. The fairing platform is typically fastened to the hub with lugs or pins. Such a retention configuration adds additional material and components to the fan section and can complicate assembly.

SUMMARY

A fan assembly includes a first fan blade with a rib extending therealong and a first fairing platform mounted on and supported from the first fan blade. The first fairing platform has a flange with a groove that mates with the rib.

In another aspect, a fan assembly includes first and second fan blades and first and second fairing platforms. The second fan blade is disposed adjacent the first fan blade. The first fairing platform is mounted on and supported from the first fan blade and the second fairing platform is mounted on and supported from the second fan blade. The second fairing platform is adapted to interface with the first fairing platform. Together first fairing platform and the second fairing platform form an inner flow path surface for the fan assembly.

In yet another aspect, a fan assembly includes a first fan blade, a first fairing platform, an adjacent fairing platform, and a clip. The first fairing platform is mounted on and supported from a first side of the first fan blade and the adjacent fairing platform is mounted on and supported from a second side of the first fan blade. The first fairing platform abuts the adjacent fairing platform adjacent a trailing edge of the blade. The clip is disposed aft of both the first fairing platform and the adjacent fairing platform and connects the first fairing platform to the adjacent fairing platform.

DETAILED DESCRIPTION

Figure 1:
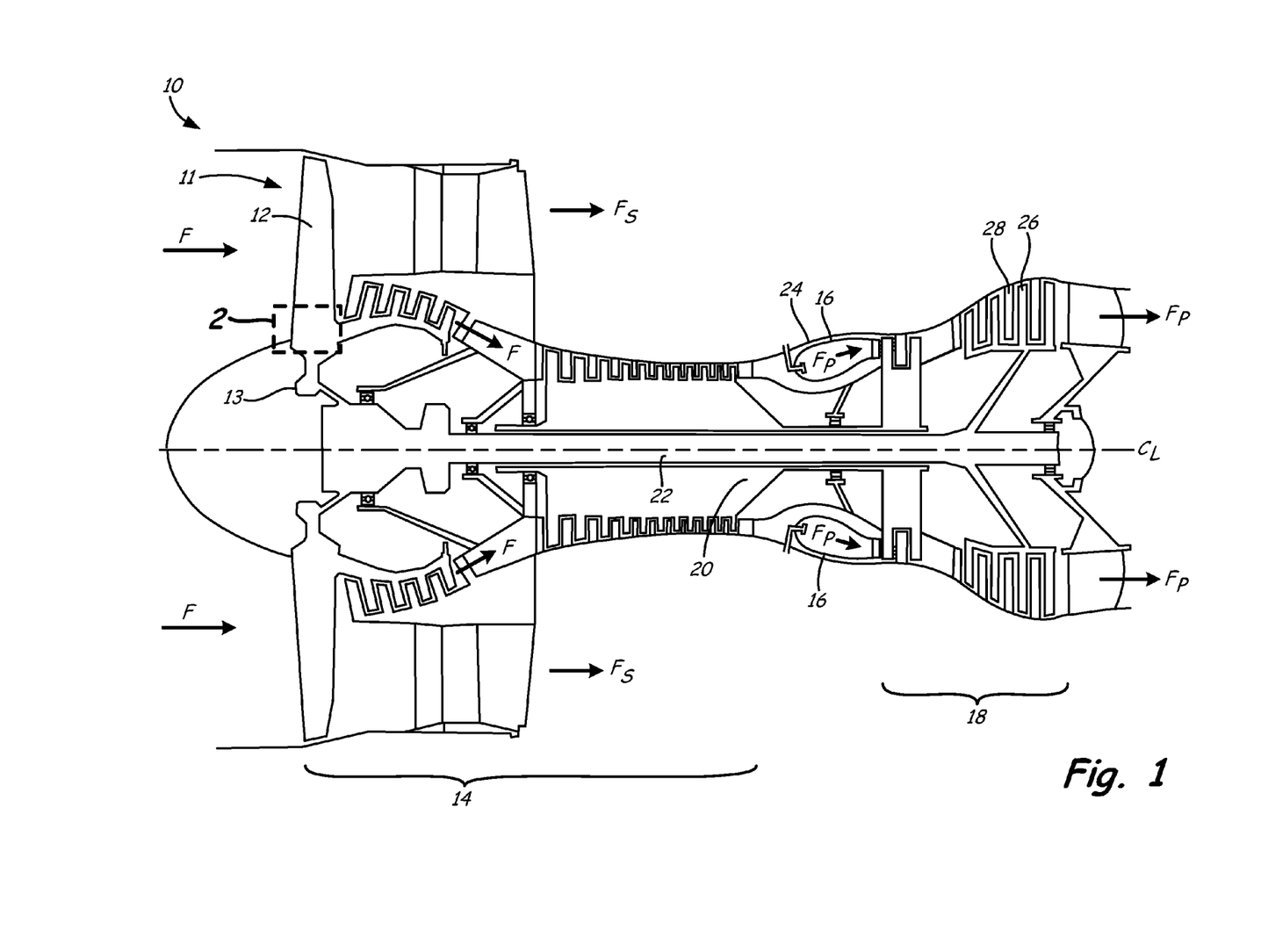
FIG. 1 is a longitudinal sectional view along an engine center line of a gas turbine engine.

FIG. 1 is a representative illustration of a gas turbine engine 10 including a fan assembly 11 embodying the present invention. The view in FIG. 1 is a longitudinal sectional view along an engine center line. FIG. 1 shows gas turbine engine 10 including a fan blade 12 and a fan hub 13, a compressor 14, a combustor 16, a turbine 18, a high-pressure rotor 20, a low-pressure rotor 22, and an engine casing 24. Turbine 18 includes rotor stages 26 and stator stages 28.

As illustrated in FIG. 1, fan blade 12 extends from fan hub 13, which is positioned along engine center line $C_L$ near a forward end of gas turbine engine 10. Compressor 14 is adjacent fan hub 13 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan hub 13. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below.

In operation, air flow F enters compressor 14 after passing between fan blades 12. Air flow F is compressed by the rotation of compressor 14 driven by high-pressure rotor 20. The compressed air from compressor 14 is divided, with a portion going to combustor 16, and a portion employed for cooling components exposed to high-temperature combustion gases. Compressed air and fuel are mixed and ignited in combustor 16 to produce high-temperature, high-pressure combustion gases Fp. Combustion gases Fp exit combustor 16 into turbine section 18. Stator stages 28 properly align the flow of combustion gases Fp for an efficient attack angle on subsequent rotor stages 26. The flow of combustion gases Fp past rotor stages 26 drives rotation of both high-pressure rotor 20 and low-pressure rotor 22. High-pressure rotor 20 drives a high-pressure portion of compressor 14, as noted above, and low-pressure rotor 22 drives fan blades 12 via fan hub 13 to produce thrust Fs from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
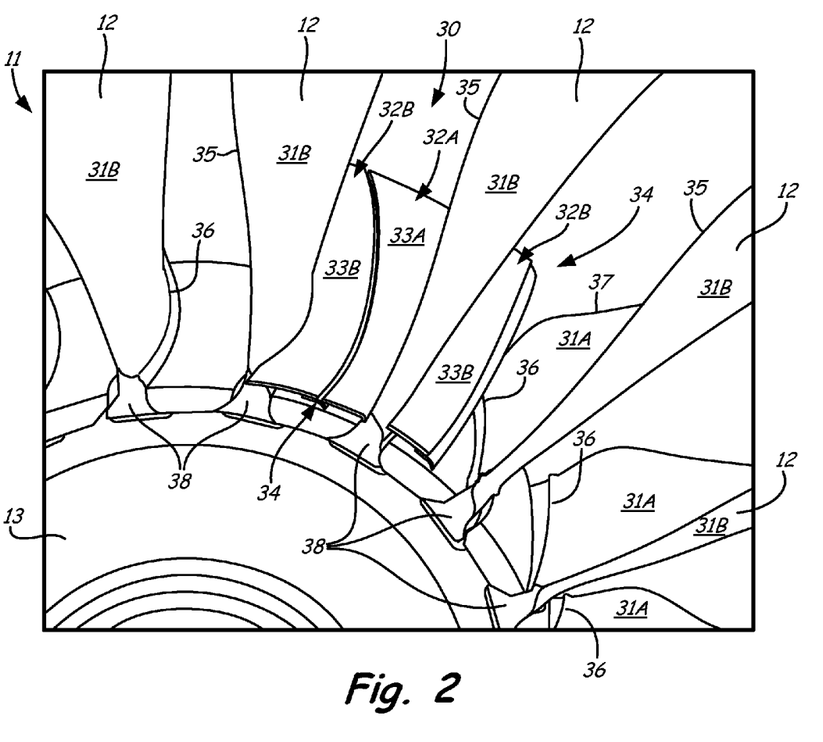
FIG. 2 is an elevated perspective view of a partially assembled portion of fan assembly including first and second fairing platforms.

FIG. 2 shows an elevated perspective view of a partially assembled portion of fan assembly 11. More particularly, FIG. 2 shows one fully assembled fairing platform assembly 30 disposed between fan blades 12. Other platform assemblies 30 are not shown in FIG. 2 so as to illustrate additional details of fan assembly 11. In addition to fan blades 12 and fan hub 13, fan assembly 11 includes fairing platform assemblies 30 (only one is shown in FIG. 2) comprised of bifurcated first fairing platforms 32A and second fairing platforms 32B. First fairing platforms 32A include a flow path surface 33A and second fairing platforms 32B include a flow path surface 33B. Fan assembly 11 additionally includes flap seals 34 and root portions 38. Fan blades 12 include first and second surfaces 31A and 31B, leading edge 35, a rib 36, a blade root portion 38, and a trailing edge 37.

Fan blades 12 extend from fan hub 13. Fan blades 12 comprise an array of a plurality of blades, which form flow passages therebetween. Fairing platforms 30 (only one is shown in FIG. 2) are disposed in an inner radial portion of flow passages between adjacent fan blades 12 and extend substantially the entire length of fan blades 12. In the embodiment shown, fairing platform assemblies 30 are mounted on and are entirely supported from first and second surfaces 31A and 31B of fan blades 12. Thus, fairing platform assemblies 30 attach to fan blades 12 themselves rather than fan hub 13. Fan platform assemblies 30 comprise separate features from the fan blades 12 and are bonded thereto.

Fairing platform assemblies 30 are bifurcated and comprised of first fairing platforms 32A (only one on shown in FIG. 2) and second fairing platforms 32B. First fairing platform 32A is adapted to interface with and mount on first surface 31A of fan blade 12 while second fairing platform 32B is adapted to mount on opposing second surface 31B of fan blades 12. First and second fairing platforms 32A and 32B are supported on fan blades 12 using known bonding materials such as epoxy adhesives, urethane adhesives, or the like. Additionally, first fairing platform 32A and second fairing platform 32B are adapted to interface with one another leaving a small gap that is sealed using conventional means such as flap seal 34. Flap seal 34 can be constructed of elastomeric material such as rubber. When mounted together to interface one another, first fairing platform 32A and second fairing platform 32B together form an inner flow path surface made up of flow path surfaces 33A and 33B for the fan assembly 11.

In one embodiment, first and second fairing platforms 32A and 32B are constructed of thermoplastic composite materials formed utilizing injection molding or compression molding processes. In some embodiments, first and second fairing platforms 32A and 32B are carbon fiber reinforced.

First and second fairing platforms 32A and 32B act in concert (along with flap seals 34) to seal the gap between the inner radial portions of the fan blades 12 adjacent the fan hub 13 to form the inner fan air flow path between the fan blades 12. Thus, first and second fairing platforms 32A and 32B prevent leakage recirculation from the blade trailing edge 37 forward to blade leading edges 35 adjacent fan hub 13. Because first and second fairing platforms 32A and 32B are of small size and lightweight construction, first and second fairing platforms 32A and 32B can be supported and bonded directly to fan blades 12 while comprising separate features therefrom. This direct bonding configuration eliminates the costly machining and materials associated with forming the fairing platforms of the prior art. Additionally, first and second fairing platforms 32A and 32B can reduce the overall weight of gas turbine engine 10 (and thus increase efficiency) as components such as lugs and pins associated with the prior art are no longer necessary to retain the fairing platforms.

Fan blades 12 transition to fan roots 38, which are received in slots in fan hub 13 outer rim. Each fan blade 12 has opposing surfaces 31A and 31B (generally called suction and pressure surfaces) with shapes that differ from one another. These opposing surfaces 31A and 31B extend from blade leading edge 35 to trailing edge 37. As is known in the art, fan roots 38 can have various designs such as dovetail, firtree, or bulb type configuration.

Figure 3A:
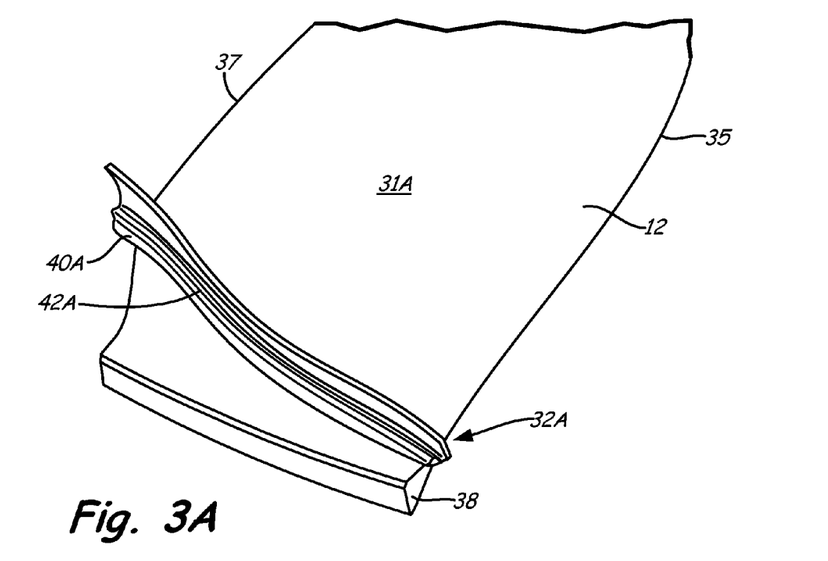
FIG. 3A is a perspective view of one embodiment of the fairing platform mounted to a fan blade.
Figure 3B:
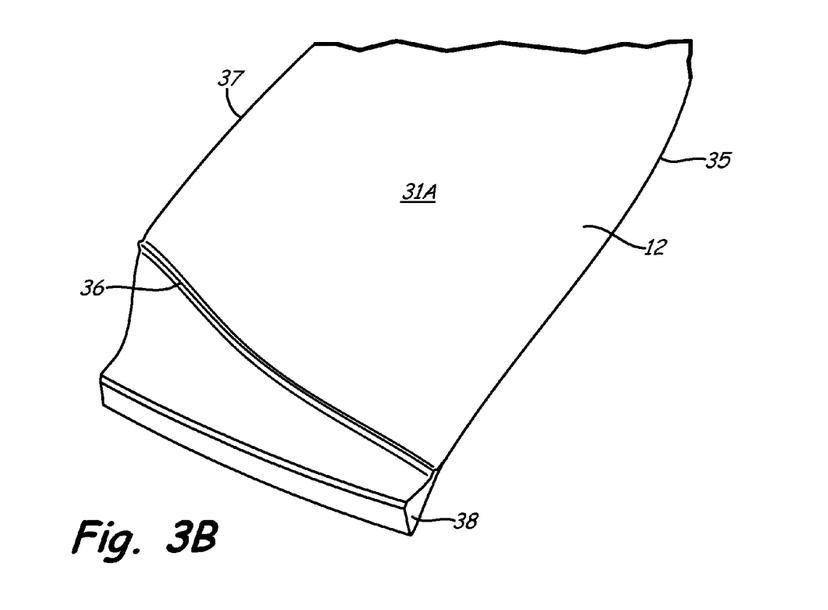
FIG. 3B is a perspective view of the fan blade from FIG. 3A including a rib.

FIG. 3B is an elevated perspective view of one fan blade 12. FIG. 3B illustrates rib 36 (additionally shown in FIG. 2) extends along substantially an entire length of fan blade 12 on both opposing surfaces 31A and 31B from leading edge 35 to trailing edge 37. Rib 36 is positioned just below inner radial flow path between fan blades 12 and is formed from the fan blade 12 itself.

As shown in FIG. 3A, first fairing platform 32A interfaces with and is mounted on fan blade 12 above fan root 38. First fairing platform 32A gradually extends away from fan root 38 as first fairing platform 32A extends toward trailing edge 37 and away from leading edge 35. As illustrated in FIG. 3A, first fairing platform has a flange 40A which extends from flow path surface 33A (FIG. 2). Flange 40A is adapted to interface with and create a bonding surface along first surface 31A of fan blade 12. In the embodiment shown, flange 40A has a groove 42A that seats on and mates with rib 36 (FIGS. 2 and 3B). Rib 36 and groove 42A locate first fairing platform 32A and provide first fairing platform 32A with additional support in shear caused by rotation of fan blades 12. Rib 36 and groove 42A (and other features discussed further herein) increase the ability of first fairing platform 32A to mount directly on fan blade 12 such that the size and extent of first fairing platform 32A can be increased eliminating the bifurcated fairing platform design in some embodiments. Thus, first fairing platform 32A could mount on and extend from a first fan blade 12 to an adjacent fan blade 12 where a flap seal could be used to seal along the surface of the adjacent fan blade 12.

Figure 4A:
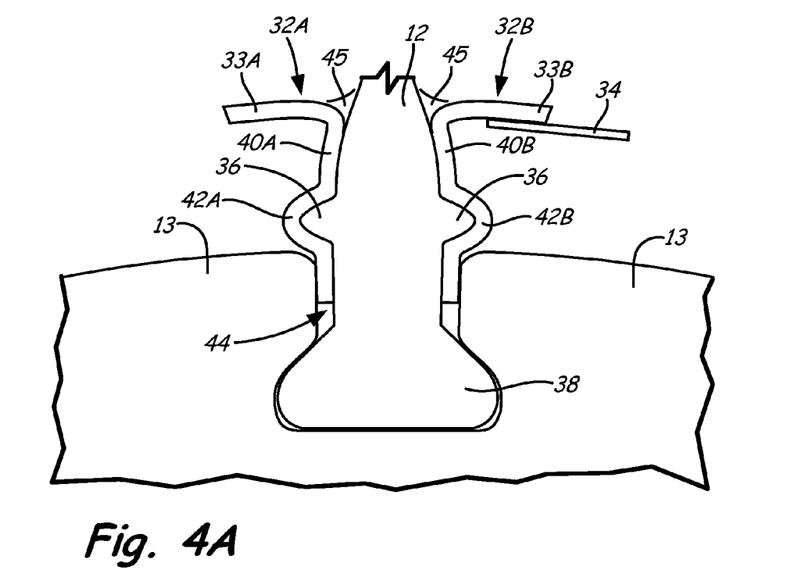
FIGS. 4A and 4B show additional alternative embodiments of first and second fairing platforms retained by portions of a fan hub.
Figure 4B:
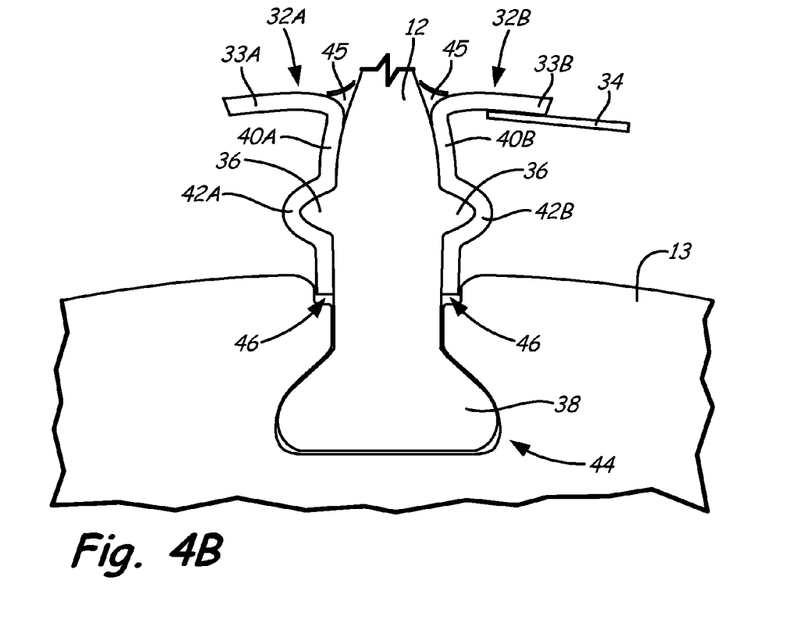

FIGS. 4A and 4B show additional alternative embodiments of first and second fairing platforms 32A and 32B. FIGS. 4A and 4B illustrate the forward portions of fairing platforms 32A and 32B as well as blade 12, blade root 38, and hub 13. In addition to features described previously such as blade 12, hub 13, first and second flow path surfaces 33A and 33B, flap seal 34, root portion 38, flanges 40A and 40B, and grooves 42A and 42B, fan assembly 11 includes fillets 45. Fillets 45 are formed of an epoxy or urethane material and are disposed along opposing surfaces of fan blade 12. Fillets 45 extend the length of first and second platforms 32A and 32B radially outward of first and second flow path surfaces 33A and 33B. Fillets 45 can be used for locating purposes and to provide first fairing platform 32A with additional support in shear caused by rotation of fan blades 12.

The embodiment of FIG. 4A additionally illustrates hub 13 having enlarged slots 44, which receive root portion 38 therein to mount blades 12 to hub 13. Slots 44 can be located at a forward portion of hub 13 and sized to receive forward inner radial portions of flanges 40A and 40B therein. Thus, fan hub 13 is adapted to receive and retain flanges 40A and 40B of the first fairing platform 32A. This arrangement provides for additional retention of first and second fairing platforms 32A and 32B if desired.

FIG. 4B shows an alternative embodiment where fan hub 13 is modified with dedicated slots 46 (rather than an enlarged slot 44) along an outer portion of slot 44. Dedicated slots 46 are disposed adjacent fan root 38 along a forward portion thereof. Dedicated slots 46 capture the forward inner radial portions of flanges 40A and 40B therein. This arrangement provides for additional retention of first and second fairing platforms 32A and 32B if desired.

Figure 5A:
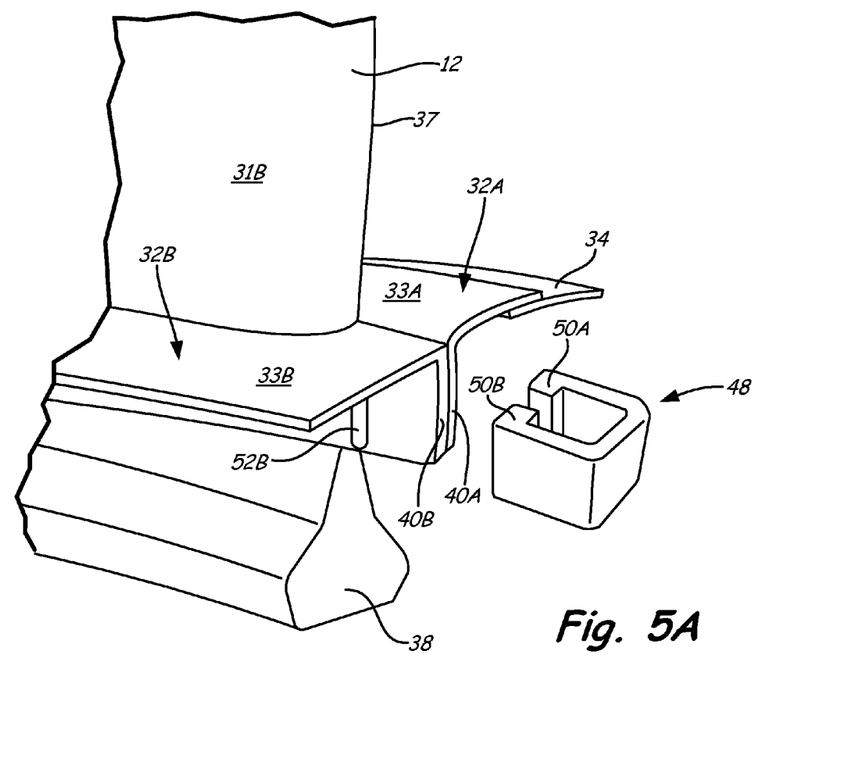
FIG. 5A is a perspective view of an aft portion of one fan blade with abutting fairing platforms mounted thereon, with the platforms connected utilizing a clip.

FIG. 5A is a perspective view of an aft portion of one fan blade 12 connected to first fairing platform 32A and adjacent abutting second fairing platform 32B. As illustrated in FIG. 5A, adjacent first and second fairing platforms 32A and 32B are mounted to both surfaces 31A (not shown) and 31B of a single fan blade 12 and adapted to abut one another near trailing edge 37 of fan blade 12. A clip 48 is adapted to mount over the rear portions of flanges 40A and 40B. Clip 48 can be constructed of identical material to first and second platforms 32A and 32B and includes interfacing tangs 50A and 50B. Tangs 50A and 50B extend toward one another and are adapted to insert in grooves 52A (not shown) and 52B in flanges 40A and 40B.

First and second fairing platforms 32A and 32B extend along opposing surfaces 31A and 31B of fan blade 12 above fan root 38. Flanges 40A and 40B of first and second fairing platforms 32A and 32B interface and abut. Flanges 40A and 40B are provided with grooves 52A (not shown) and 52B that receive tangs 50A and 50B when clip 48 is connected to first and second fairing platforms 32A and 32B. More particularly, clip 48 is designed to snap over and hold together first and second fairing platforms 32A and 32B.

Figure 5B:
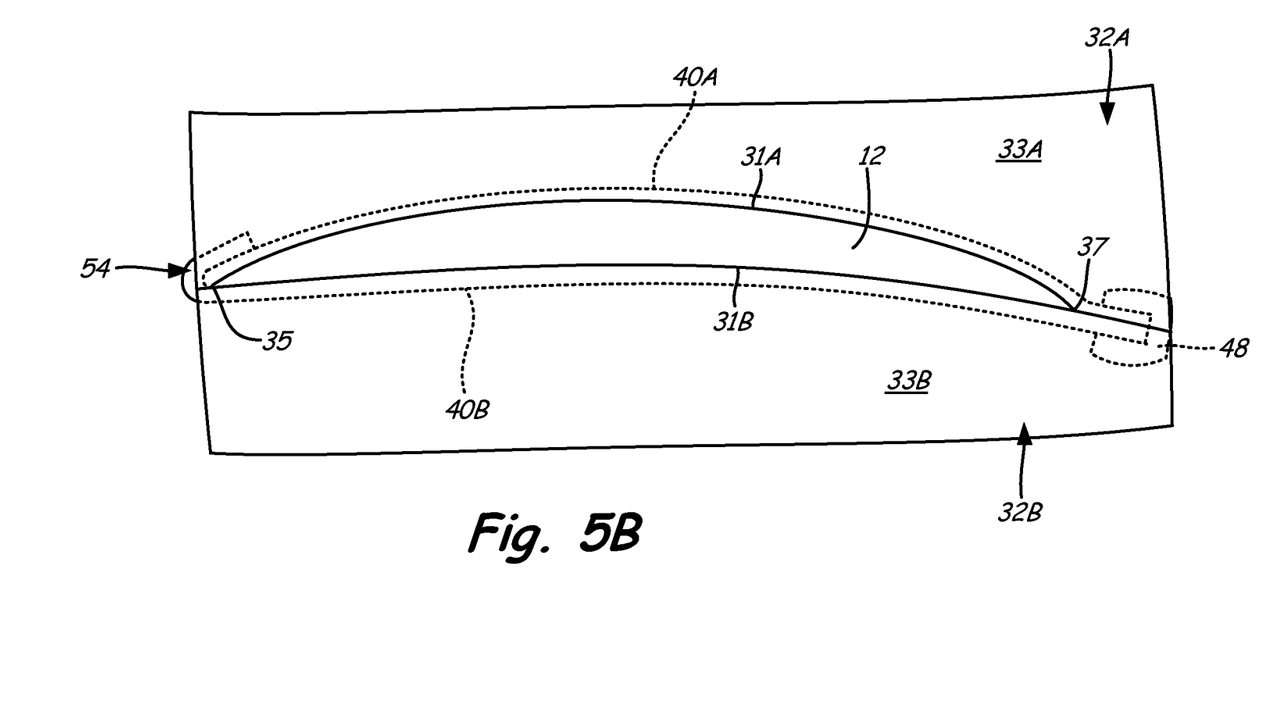
FIG. 5B is a top view of fan blade and abutting fairing platforms that are connected utilizing the clip of FIG. 5A and a hook.

FIG. 5B is a top view of fan blade 12 and first and second fairing platforms 32A and 32B. First and second fairing platforms 32A and 32B are arranged in an abutting configuration to either side of fan blade 12. First and second fairing platforms 32A and 32B are mounted to opposing surfaces 31A and 31B of fan blade 12 and are retained along an aft end near blade trailing edge by clip 48. Flow path surfaces 33A and 33B are illustrated in FIG. 5B, and cover flanges 40A and 40B, which are shown in phantom.

Flanges 40A and 40B are modified to interact with one another and retain first and second fairing platforms 32A and 32B together. More particularly, flange 40B includes a hook 54 that extends around leading edge 35 of the fan blade 12 to overlap and capture flange 40A of the abutting first fairing platform 32A. Hook 54 overlaps flange 40A and is designed to create a snap fit that retains first and second fairing platforms 32A and 32B together.

As described herein, the various embodiments of fairing platforms allow fairing platforms to be mounted on and bonded to fan blades. This direct bonding configuration eliminates the costly machining and materials associated with forming the fairing platforms of the prior art. Additionally, fairing platforms described herein reduce the overall weight of gas turbine engine (and thus increase efficiency) as components such as lugs and pins associated with the prior art are no longer necessary to retain the fairing platforms.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fan assembly comprising
a first fan blade having a rib extending therealong;
a first fairing platform mounted on and supported from the first fan blade, wherein the first fairing platform has a first flange with a groove that mates with the rib;
a second fairing platform, wherein the second fairing platform is adjacent to and abutting the first fairing platform; and
a first retention feature having a configuration selected from the group consisting of a clip and a hook, the first retention feature connecting the first fairing platform to the second fairing platform near at least one of a leading and trailing edge of the first fan blade.

2. The assembly of claim 1, further comprising:
a second fan blade disposed adjacent the first fan blade, wherein the second fairing platform is mounted on and supported from the second fan blade, and wherein the second fairing platform is adapted to interface with the first fairing platform, and the first fairing platform and the second fairing platform together form an inner flow path surface for the fan assembly.

3. The assembly of claim 2, wherein a gap between the first fairing platform and the second fairing platform is sealed with a flap seal.

4. The assembly of claim 1, further comprising a fan hub that is adapted to receive and retain a forward portion of the flange of the first fairing platform.

5. The assembly of claim 4, wherein the fan hub has a dedicated slot disposed adjacent a fan root which captures the flange therein.

6. The assembly of claim 1, further comprising a fillet extending along the first fan blade, wherein the fillet is disposed radially outward of and contacts the first fairing platform.

7. The assembly of claim 1, wherein the first retention feature comprises a clip and wherein the clip extends around the trailing edge of the first fan blade to overlap and capture a second flange of the second fairing platform.

8. The assembly of claim 7, further comprising a second retention feature having a hook connected to the first flange, wherein the hook extends around the leading edge of the first fan blade to overlap and capture a second flange of the second fairing platform.

9. A fan assembly comprising:
a first fan blade with a leading edge and a trailing edge;
a second fan blade disposed adjacent the first fan blade;
a first fairing platform mounted on and supported from the first fan blade, wherein the first fairing platform has a first flange;
a second fairing platform mounted on and supported from the second fan blade, wherein the second fairing platform is adapted to interface with the first fairing platform, and wherein together the first fairing platform and the second fairing platform together form an inner flow path surface for the fan assembly; and
a first retention feature having a configuration selected from the group consisting of a clip and a hook, the first retention feature connecting the first fairing platform to the second fairing platform near at least one of the leading and trailing edge of the first fan blade.

10. The assembly of claim 9, wherein the first fan blade comprises a first rib and a second rib, wherein the first rib extends along a first surface of the fan blade and the second rib extends along a second surface of the fan blade, and wherein the first fairing platform has a flange with a groove that mates with the first rib and an adjacent second fairing platform that abuts the first fairing platform has a flange with a groove that mates with the second rib.

11. The assembly of claim 10, further comprising a fan hub that is adapted to receive and retain a forward portion of the flange of the first fairing platform.

12. The assembly of claim 11, wherein the fan hub has a dedicated slot disposed adjacent a fan root which captures the flange therein.

13. The assembly of claim 9, wherein a gap between the first fairing platform and the second fairing platform is sealed with a flap seal.

14. The assembly of claim 9, further comprising a fillet extending along the first and second fan blades, wherein the fillet is disposed radially outward of and contacts the first fairing platform.

15. The assembly of claim 9, wherein the first retention feature comprises a clip and wherein the clip extends around the trailing edge of the first fan blade to overlap and capture a second flange of the second fairing platform.

16. The assembly of claim 15, further comprising a second retention feature having a hook connected to the first flange that extends around the leading edge of the first fan blade to overlap and capture a second flange of the second fairing platform.

17. A fan assembly comprising
a first fan blade;
a first fairing platform mounted on and supported from a first surface of the first fan blade and an abutting second fairing platform mounted on and supported from a second surface of the first fan blade, wherein the first fairing platform interfaces with the abutting second fairing platform near a trailing edge of the blade, and
a clip disposed aft of the first fairing platform and the adjacent fairing platform and connecting the first fairing platform to the adjacent fairing platform.

18. The assembly of claim 17, wherein the first fairing platform includes a flange with a hook that extends around a leading edge of the first fan blade to overlap and capture a second flange of the abutting second fairing platform.

19. The assembly of claim 18, further comprising a fan hub that is adapted to receive and retain the flange of the first fairing platform.

20. The assembly of claim 17, further comprising:
a second fan blade disposed adjacent the first fan blade; and
an adjacent second fairing platform mounted on and supported from the second fan blade, wherein the adjacent second fairing platform is adapted to interface with the first fairing platform, and wherein the first fairing platform and the adjacent second fairing platform together form an inner flow path surface for the fan assembly.

* * * * *